2,798,092
Patented July 2, 1957

2,798,092

GLUTAMINE SYNTHESIS

Rose Marie Joyce, Northbrook, and Bruno Vassel, Deerfield, Ill., assignors to International Minerals & Chemical Corporation, a corporation of New York No Drawing. Application April 25, 1955,
Serial No. 503,812

9 Claims. (Cl. 260—534)

This invention relates to the preparation of glutamic acid derivatives and more particularly to a process for preparing L-glutamine.

In the past L-glutamine has been synthesized by processes which involve a complicated series of steps. Because of the nature of the reactions involved and because of the plurality of steps, yields have been very low. Generally low yields are obtained using the best known synthesis, that is, the carbobenzyloxy method of Bergmann, Zervas, and Salzmann, Berichte 66B, 1288-90 (1933), and the method of Kidd and King, Nature, 162, 776 (1948). In addition to these disadvantages in the Bergmann method there was the hazard involved in working with benzyl chloroformate, which is a reactant in one of the steps of these processes. Upon standing and/or drying, this compound spontaneously decomposes in an explosive manner and in the past has caused serious injury to workers. In the Kidd and King method, there are an even greater number of steps involved than in the Bergmann method, and the reagent employed, which is phthalic anhydride, tends to racemize the glutamic acid and the glutamine produced is not the pure optically active form found in nature.

It is an object of the instant invention to provide an improved method for the synthesis of glutamine having the same optical activity as the glutamine found in nature, that is, L-glutamine.

It is further object of the instant invention to provide a method for synthesizing L-glutamine in comparatively high yields without resorting to the production and resolution of a racemic mixture.

It is a further object of the instant invention to provide an improved synthesis of L-glutamine in which comparatively high yields are obtained using readily available and relatively cheap reactants.

These and other objects of the instant invention will become more apparent upon a fuller understanding of the invention as hereinafter described.

In accordance with this invention, L-glutamine is produced by reacting a gamma-amide of an N-carboallyloxy-L-glutamic acid with a hydrogen halide, such as hydrogen chloride or hydrogen bromide under anhydrous conditions in a solvent medium in which glutamine is insoluble and in which hydrogen bromide behaves as a weak electrolyte, and recovering L-glutamine by crystallization from the reaction product mixture. By the term "glutamine" as used herein is meant the optically active natural form of glutamine that is L-glutamine.

In one embodiment of this invention a gamma-ester of an N-carboallyloxy-L-glutamic acid is amidated to produce the corresponding gamma-amide of N-carboallyloxy-L-glutamic acid and the latter is reacted with hydrogen bromide or hydrogen chloride under anhydrous conditions in solution in a solvent medium in which glutamine is insoluble and in which hydrogen bromide behaves as a weak electrolyte. L-glutamine is recovered from the reaction product mixture by crystallization. The solvent medium may comprise a lower organic acid, such as, for example, acetic acid or propionic acid, or the like, or a non-acidic organic solvent for the gamma amide, and preferably a mixture of such a lower organic acid and a non-acidic organic solvent which is inert toward hydrogen bromide and ammonia. The lower organic acid may be any organic acid having less than about 8 carbon atoms in which the gamma-amide of N-carboallyloxy-L-glutamic acid is soluble. Exemplary lower organic acids are formic acid, acetic acid, propionic acid, butyric acid, isobutyric acid, and the like. Organic acids containing less than about 5 carbon atoms are preferred and acetic acid is particularly preferred for use in this invention due to its ready availability, its ease in handling, and the high yields of glutamine which are obtained when acetic acid is utilized. Solvent media comprising acetic acid and another organic solvent, such as, for example, a lower organic ester or chloroform, produce the highest yields of glutamine in accordance with this invention.

The non-acidic organic solvent which is admixed with the aforementioned lower organic acid to produce the solvent medium used in carrying out the reaction of the gamma-amide of an N-carboallyloxy-L-glutamic acid with hydrogen halide may be any organic solvent in which glutamine is insoluble and in which hydrogen bromide behaves as a weak electrolyte. This organic solvent should also be one which is substantially inert toward hydrogen bromide and ammonia, otherwise the efficiency of the reaction is seriously impaired. It is not necessary that the gamma-amide of the N-carboallyloxy-L-glutamic acid be soluble in the organic solvent, but it is essential that the latter compound be soluble in a mixture of the organic solvent and the lower organic acid. In those cases where the gamma-amide of the N-carboallyloxy-L-glutamic acid is insoluble in the organic solvent, solution in a mixture of the organic solvent and the lower organic acid can be effected by increasing the quantity of lower organic acid present. In those cases where there is partial solubility in the organic solvent, the quantity of lower organic acid necessary to dissolve the gamma-amide can be proportionally reduced. Desirably, the amount of lower organic acid utilized will be maintained as low as possible, since ultimately it will have to be neutralized. Utilizing acetic acid in admixture with another organic solvent as the solvent media, a ratio of the order of about 1 part acid for each part of organic solvent is suitable, although more than this amount of acid may be employed if an extended crystallization time is unimportant.

Representative organic solvents which may be utilized in conjunction with lower organic acids, such as, for example, acetic acid, to form the solvent medium in which the reaction of this invention is carried out include lower organic esters, such as, for example, methyl acetate, ethyl acetate, propyl acetate, isobutyl acetate, n-butyl acetate, methyl propionate, ethyl propionate, and the like. Esters of lower organic acids and lower alcohols are preferred and esters of acetic acid and lower alcohols, such as ethyl acetate and propyl acetate are particularly preferred. In addition to the aforementioned esters, solvents, such as chloroform, cresol, and dioxane may also be utilized. All of these solvents are inert toward hydrogen bromide and hydrogen chloride and ammonia and do not dissolve glutamine.

Also a solution of hydrogen bromide or hydrogen chloride in these solvents, or in mixtures of these solvents with lower organic acids is a weak electrolyte. By the term "weak electrolyte" as it appears in the specification and claims is meant a solution of hydrogen bromide or hydrogen chloride in an organic solvent medium, said solution being characterized by an equivalent conductance which is increased by increasing the concentration of dissolved hydrogen bromide. The equivalent conductance of a hydrogen halide solution is calculated by the following equation:

$$\Lambda = \frac{1000L}{C}$$

where $\Lambda$ is the equivalent conductance in mhos per equivalent of hydrogen halide per liter of solution, L is the conductance of the solution in mhos and C is the concentration of the hydrogen halide in solution in terms of normality.

The solvent media useful in this invention have an equivalent conductance of less than about 20, and preferably less thna about 5. Table I shows the equivalent conductances of some hydrogen bromide solutions useful in this invention.

TABLE I

| Solvent | HBr Concentration (Normality) | Equivalent Conductance $\Lambda$ |
|---|---|---|
| Acetic Acid | 1 | 4.3 |
|  | 0.1 | 1 |
|  | 0.01 | 0.0565 |
| 1 pt. acetic acid: 1 pt. ethyl acetate | 1 | 1.8 |
|  | 0.1 | 0.23 |
|  | 0.01 | 0.22 |
| 1 pt. acetic acid: 1 pt. chloroform | 1 | 2.0 |
|  | 0.1 | 0.796 |
|  | 0.01 | 0.0092 |
| 1 pt. acetic acid: 1 pt. cresol | 1 | 2.4 |
|  | 0.1 | 1.49 |
|  | 0.01 | 1.2 |

The reaction of a gamma-amide of an N-carboallyloxy-L-glutamic acid with hydrogen bromide or hydrogen chloride under anhydrous conditions in the above described solvent media results in the production of an L-glutamine hydrogen halide salt which separates as a solid from the reaction product mixture. The hydrogen halide addition salt which is a sticky straw-colored mass and difficult to handle, is redissolved by adding sufficient alcohol such as methanol, ethanol, etc., to the reaction product mixture with stirring. After dissolution of the solids is completed, the solution is neutralized by the addition of an alkali, such as aqueous ammonia. The reaction product mixture is then cooled to crystallize L-glutamine from solution. By operating in accordance with this invention, glutamine having a purity of as high as 95% may be obtained. The yields of glutamine can amount to up to about 67% of the theoretical based upon NH$_4$-N-carboallyloxy-L-glutaminate utilized as a starting material.

In carrying out the process of this invention using L-glutamic acid as a starting material, the L-glutamic acid is esterified with an alcohol, preferably a lower aliphatic alcohol, that is, an alcohol having less than about eight carbon atoms, such as, for example, methyl alcohol or ethyl alcohol, to produce the gamma-ester of L-glutamic acid. Esterification is preferably carried out at temperatures below about room temperature in the presence of sulfuric acid as catalyst.

The gamma-ester of L-glutamic acid has the structural formula:

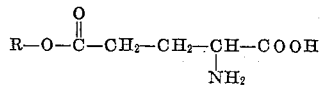

when R is an alkyl or a phenyl group. Gamma-alkyl esters of L-glutamic acid are preferred and particularly gamma-alkyl esters of L-glutamic acid in which the alkyl group is a lower alkyl group, that is, an alkyl group containing less than about 8 carbon atoms. Specific esters which are useful include gamma-methyl-, gamma-ethyl-, gamma-propyl-, gamma-isopropyl-, gamma-butyl ester, etc., of L-glutamic acid. The gamma-methyl ester of L-glutamic acid is particularly preferred because yields of L-glutamine obtained are higher than when other gamma-esters of L-glutamic acid are employed and less time is required in carrying out the process.

The gamma-ester of L-glutamic acid is reacted with the chloroformate of an allyl compound, such as allylchloroformate, phenallylchloroformate, methallylchloroformate, ethallylchloroformate, and higher substituted alkallylchloroformates. Alkyl substituted allylchloroformates in which the alkyl group is a lower alkyl groups, that is, an alkyl group containing less than about 8 carbon atoms, are preferred as producing the most desirable results in accordance with this invention. Unsubstituted allylchloroformate is particularly preferred by reason of convenience in handling, commercial availability, and the high yields of L-glutamine produced utilizing this compound.

The reaction of the gamma-ester of L-glutamic acid and an allylchloroformate is exothermic, and results in the gamma-ester of an N-carboallyloxy-L-glutamic acid having the following structure formula:

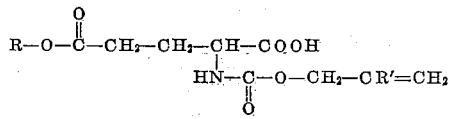

where R is an alkyl or phenyl group and R' is H, an alkyl or phenyl group. The reactants are generally admixed at a temperature between about 0° C. and about 55° C., preferably between about 5° C. and about 30° C., and the reaction allowed to proceed to completion. In a preferred embodiment the mixture is agitated at about atmospheric temperature for between about ½ hour and about 2 hours. The resulting reaction products are extracted with a solvent to separate the unreacted allylchloroformate. An organic solvent, such as chloroform, carbon tetrachloride, methylene chloride, or ethylene dichloride is used. The aqueous residue is then acidified, for example with hydrochloric acid, to a pH between about 1.5 and about 2.5. The gamma-ester of N-carboallyloxy-L-glutamic acid is extracted from the acidified solution with a solvent, such as chloroform, carbon tetrachloride, methylene chloride, ethylene dichloride, ether, ethylacetate, and the like. In a preferred embodiment the product is extracted with chloroform and the chloroform extract is dried, for example, with anhydrous calcium sulfate or sodium sulfate. It is not necessary to dry the solution, but yields are improved by doing so. The solvent, such as chloroform, is then separated from the gamma-ester of N-carboallyloxy-L-glutamic acid, for example, by evaporation under reduced pressure.

The gamma-ester of N-carboallyloxy-L-glutamic acid is then amidated with ammonia to produce the ammonium salt of the gamma-amide of N-carboallyloxy-L-glutamic acid having the structural formula:

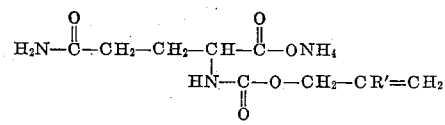

where R' is hydrogen, alkyl or a phenyl group. Concentrated ammonium hydroxide or absolute methanol saturated with ammonia may be employed for the amidation of the ester. In a preferred embodiment a 28% ammonia solution is employed at a temperature between about 50° C. and about 60° C. in a pressure vessel over a period of between about 20 to 24 hours. When lower temperatures are employed, the yields obtained are lower. In another embodiment, liquid ammonia is employed in a pressure vessel at about atmospheric temperature to amidate the gamma-ester. In still another embodiment, the amidation is carried out by saturating methanol with ammonia at about 0° C., admixing with the gamma-ester, and heating to between about 45° C. and about 50° C. in a pressure vessel. Ammonia is removed from the gamma-amide, for example, by evaporation. The product is the ammonium salt of the gamma-amide of N-carboallyloxy-L-glutamic acid.

The ammonium salt of the amide is dried and dissolved in a lower organic acid, preferably acetic acid, preferably at about 50° C. to 55° C. Preferably, an organic solvent, such as ethyl acetate is then added to the solution. The amounts of lower organic acid and ethyl acetate or other organic solvent to be utilized in any given instance are predetermined so that the quantity of acid present will be as small as possible, while allowing the gamma-amide of N-carboallyloxy-L-glutamic acid, or the ammonium salt thereof, to be completely dissolved at about 50° C. to 55° C. The gamma-amide of N-carboallyloxy-L-glutamic acid may be utilized as such, but is preferably used in the form of its ammonium salt. Following the addition of the ethyl acetate or other organic solvent, dry hydrogen bromide is bubbled through the solution, preferably at a temperature between about 10° C. and about 40° C. Room temperature is satisfactory. After between about 2 hours and about 24 hours with occasional agitation at 25° C. to 30° C., the reaction mixture is cooled. An alcohol, such as methanol, is then added to the reaction product mixture in sufficient amount to completely dissolve any solids which have separated. Following the dissolution of solids, the solution is neutralized to pH of about 7 by the addition of an alkali, such as 28% aqueous ammonia. The alkali is added while the solution is maintained at a temperature below room temperature, preferably at about 10° C. The neutralized solution is then maintained at a temperature of the order of about 10° C. to permit L-glutamine to crystallize. The L-glutamine crystals may be separated by any convenient means such as by filtration. The crystalline glutamine obtained has a purity between about 75% and about 95% and may be recrystallized to raise the purity if desired.

The term "an allylchloroformate" as used herein includes allylchloroformate and phenyl- and alkyl-substituted allylchloroformates in which the alkyl group is preferably a lower alkyl group, that is, an alkyl group containing less than about eight carbon atoms. Similarly, the terms "an N-carboallyloxy-L-glutamic acid" and "an N-carboallyloxy-L-glutamine" refer to compounds in which the allyloxy group may be an unsubstituted allyloxy group or a phenyl- or alkyl-substituted allyloxy group in which the alkyl group is a lower alkyl group as described above. The terms "allylchloroformate," "N-carboallyloxy-L-glutamic acid" and "N-carboallyloxy-L-glutamine" refer to compounds in which the allyl group is unsubstituted.

The following examples illustrate specific embodiments of the invention, all parts and percentages being by weight, unless otherwise indicated.

Example I

L-glutamic acid in the amount of about 147 parts was suspended in about 1890 parts of absolute methanol. The mixture was cooled in an ice bath to about 12° C., and about 134 parts of sulfuric acid (95%) was added with stirring at such a rate as to keep the temperature of the mixture below about 25° C. The cooling was discontinued, but the reaction mixture was stirred at about 27° C. for about 5 hours. The mixture was again cooled to about 12° C. and neutralized to a pH of about 7 with a 1:1 mixture of diethylamine and methanol. The mixture was then kept at about 0° C. or below for at least 5 hours. Agitation was unnecessary. The reaction product, which was gamma-methyl-L-glutamate, was recovered by filtration.

Gamma-methyl-L-glutamate, prepared as above described, in the amount of about 161 parts was agitated in about 600 parts of water containing about 69.6 parts of magnesium hydroxide. To this mixture was added with agitation about 145 parts of allyl chloroformate over a period of about 20 to 30 minutes. The reaction mixture was cooled so that the temperature did not rise above about 35° C. After addition of the allylchloroformate, the reaction mixture was stirred for about 2 hours at about 27° C. and then stored for at least 15 hours, at about 3° C. The reaction mixture was filtered and the filtrate extracted with two 300 part portions of chloroform. The extracted filtrate was acidified to a pH of about 1.8 with a 1:1 mixture of water and concentrated hydrochloric acid. The acidified mixture was again extracted with three 300 part portions of chloroform. The chloroform extracts were combined and washed once with about 200 parts water. The chloroform was then evaporated under reduced pressure (about 25 mm. Hg) with a bath temperature not greater than about 65° C. The residue was gamma-methyl-N-carboallyloxy-L-glutamate.

This derivative of glutamic acid was a white solid and had a melting point of about 48° C. to 50° C. The specific rotation was minus 16.2 degrees at 28° C. when 4.08 grams were dissolved in 100 mls. of water. The refractive index of the compound at 26.5° C. was 1.473. The nitrogen content was determined as 5.83%, as compared to 5.71% theoretical or calculated nitrogen content.

Gamma-methyl-N-carboallyloxy-L-glutamate produced as above in the amount of about 158 parts was dissolved in about 170 parts of 28% aqueous ammonium hydroxide solution and maintained in an autoclave (under autogenous pressure) at about 53° C. for about 24 hours. The solution was evaporated under reduced pressure (about 30 mm. Hg) using a bath temperature not over about 65° C. The evaporation was continued until the reaction mixture ceased to bubble. The product was a viscous taffy-like material which became glass-like in character upon cooling. It was brittle and transparent. The product was a mixture of N-carboallyloxy-L-glutamine and its ammonium salt. The ammonium salt of N-carboallyloxy-L-glutamine had a specific rotation of −2.4 at 20° C. when 4.4 grams were dissolved in 100 mls. of water. The nitrogen content was determined as 16.8%; the theoretical nitrogen content is 17.0%. The ammonium salt of N-carboallyloxy-L-glutamine was converted to N-carboallyloxy-L-glutamine by acidification with a weak organic acid such as formic acid.

The ammonium salt of N-carboallyloxy-L-glutamine in the amount of 25.4 parts was suspended in a mixture containing 130 ml. of ethyl acetate and 12.5 ml. of glacial acetic acid. The suspension was warmed to a temperature of about 40° C. to 50° C. with agitation, and the mixture was then cooled to about 30° C. Dry hydrogen bromide gas was bubbled through the solution with external cooling until about 27 parts of hydrogen bromide were absorbed. The reaction vessel was then sealed to prevent the entrance of moisture and the reaction mixture allowed to stand at about 25° C. to 30° C. for 2 hours with intermittent agitation. Methanol in the amount of about 130 ml. was then added to the reaction vessel with vigorous agitation to effect complete solution of the solids which precipitated during the reaction. The resultant clear solution was neutralized to about 7.5 by the addition of about 11 ml. of 28% aqueous ammonia. The reaction mixture was then stored at about 50° C. for 2 hours and the precipitated solids removed by filtration. The precipitate was washed with methanol and dried at 75° C. The precipitate amounted to 11.4 parts of 84% pure glutamine which corresponded to a yield of 75.8% of the theoretical based upon the quantity of NH₄-N-carboallyloxy-L-glutamine utilized.

Example II

The ammonium salt of N-carboallyloxy-L-glutamine in the amount of 25.4 parts prepared as in Example I was suspended in a mixture containing 130 ml. of ethyl acetate and 12.5 ml. of glacial acetic acid. The suspension was warmed to a temperature of about 40° C. to 50° C. with agitation and the mixture was then cooled to about 30° C. Dry hydrogen bromide gas was bubbled through the solution with external cooling until about 27 parts of hydrogen bromide were absorbed. The reaction vessel was then sealed to prevent the entrance of moisture and the reaction mixture allowed to stand at about 25° C. to 30° C. for 2 hours with intermittent agitation. Methanol in the amount of about 130 ml. was then added to the reaction vessel with vigorous agitation to effect complete solution of the solids which precipitated during the reaction. The resultant clear solution was neutralized to about 7.5 by the addition of about 45 ml. of diethylamine. The reaction mixture was then stored at about 50° C. for 2 hours and the precipitated solids removed by filtration. The precipitate was washed with methanol and dried at 75° C. The precipitate amounted to 11.4 parts of 85% glutamine which corresponded to a yield of 75% of the theoretical based upon the quantity of NH4-N-carboallyloxy-L-glutamine utilized as a starting material.

Example III

The ammonium salt of N-carboallyloxy-L-glutamine prepared as in Example I was added in an amount of about 18 parts to 36.5 ml. of glacial acetic acid with agitation. The mixture was heated to about 50° C. to about 55° C. to effect solution. The resulting solution was cooled to about 25° C. to about 30° C. and 36.5 ml. of n-propyl-acetate was added. Dry hydrogen bromide gas was introduced into the solution at 20–25° C. until 3 equivalent weights of hydrogen bromide based on the weight of ammonium N-carboallyloxy-L-glutaminate was absorbed and then an additional 10% excess of hydrogen bromide was added. The reaction vessel was sealed against the entrance of moisture and agitated occasionally at 25° C. to 30° C. over a period of about 2 hours. Methanol was then added to the reaction mixture in the amount of about 100 ml. with agitation until all the precipitated solids were dissolved. The clear solution was neutralized to pH 7.0 to 7.5 by the addition of about 16 ml. of 28% aqueous ammonia. The neutralized reaction mixture was then stored at 0° C. to 10° C. for two hours and filtered to separate the solids which precipitated. The precipitated solids were washed with methanol and dried at about 75° C. The yield of glutamine amounted to about 69% of theory and was obtained in a purity of about 76%.

Example IV

The ammonium salt of N-carboallyloxy-L-glutamine prepared as in Example I was added in an amount of about 17.4 parts to 50 parts of glacial acetic acid at about 50° C. and stirred until solution was effected. The clear solution was cooled to about 30° C. and hydrogen bromide gas bubbled through the solution until about 25 parts of hydrogen bromide was absorbed. The reaction vessel was sealed against the entrance of moisture and agitated occasionally at 30° C. over a period of about 2 hours. Methanol was then added to the reaction mixture in the amount of about 150 ml. with agitation until all the precipitated solids were dissolved. The clear solution was neutralized with 28% aqueous ammonia to pH between about 7.0 and about 7.5. The neutralized reaction mixture was then stored at between about 0° C. and about 10° C. for about 12 hours to allow the glutamine to crystallize out of solution. The crystalline product was separated from the solution by filtration and washed with methanol. After drying, the product had a purity of about 73% and the glutamine present was in a yield equivalent to 79% of the theoretical.

Example V

The process of Example III was carried out with the exception that an equivalent weight of isobutyl acetate was substituted for n-propyl acetate. By proceeding in this manner, L-glutamine having a purity of 85.9% was obtained in a yield of 66.2% of the theoretical.

Example VI

The ammonium salt of N-carboallyloxy-L-glutamine in the amount of about 25.4 parts was suspended in a mixture containing 130 ml. of chloroform and 12.5 ml. of glacial acetic acid. The suspension was warmed to between about 40° C. to about 50° C. with vigorous agitation, and the mixture was then cooled to about 30° C. Dry hydrogen bromide gas was introduced into the solution with external cooling until 27.0 parts were absorbed. The reaction vessel was then sealed against the entrance of moisture and allowed to stand at between about 25° C. to about 30° C. for about 2 hours with occasional agitation. Methanol was then added to the reaction mixture in the amount of about 130 ml. with agitation until all of the precipitated solids were dissolved. The resultant clear solution was neutralized to a pH between about 7.0 and about 7.5 by the addition of about 45 ml. of diethylamine. The neutralized reaction mixture was then stored at about 5° C. for 2 hours to allow glutamine to crystallize from the solution. The crystalline glutamine was separated by filtration, washed with methanol, and dried at 75° C. The glutamine had a purity of about 88% and was obtained in a yield of about 73% of the theoretical.

Having thus fully described and illustrated the character of the instant invention, what is desired to be secured by Letters Patent is:

1. A process for producing L-glutamine which comprises preparing a solution of a gamma-amide of an N-carboallyloxy-L-glutamic acid in a mixture of a lower organic acid having fewer than 8 carbon atoms in the molecule and another organic solvent which is inert with respect to hydrogen halides and in which hydrogen halide behaves as a weak electrolyte, treating said solution under anhydrous conditions with a hydrogen halide selected from the group consisting of hydrogen chloride and hydrogen bromide, adding an alcohol to the reaction mixture in an amount sufficient to dissolve any precipitated solids, neutralizing the reaction mixture, and crystallizing L-glutamine therefrom.

2. The process of claim 1 wherein said hydrogen halide is hydrogen chloride.

3. A process for producing L-glutamine which comprises preparing a solution of a gamma-amide of an N-carboallyloxy-L-glutamic acid in a mixture of a lower organic acid having fewer than 5 carbon atoms in the molecule and another organic solvent which is inert with respect to hydrogen bromide and in which the equivalent conductance of hydrogen bromide increases as the concentration of hydrogen bromide is increased, treating said solution under anhydrous conditions with hydrogen bromide until the reaction is substantially complete, adding an alcohol to the reaction mixture in an amount sufficient to dissolve any precipitated solids, adjusting the pH of the reaction mixture to about 7 with alkali, and crystallizing L-glutamine therefrom.

4. A process for producing L-glutamine which comprises preparing a solution of a gamma-amide of an N-carboallyloxy-L-glutamic acid in a mixture of acetic acid and another organic solvent which is inert with respect to hydrogen bromide and in which the equivalent conductance of hydrogen bromide increases as the concentration of hydrogen bromide is increased, treating said solution under anhydrous conditions with hydrogen bromide until the reaction is substantially complete, adding an alcohol to the reaction mixture in an amount sufficient to dissolve any precipitated solids, adjusting the pH of the reaction mixture to about 7 with alkali, and crystallizing L-glutamine therefrom.

5. A process for producing L-glutamine which comprises preparing a solution of a gamma-amide of an N-carboallyloxy-L-glutamic acid in a mixture of acetic acid and another organic solvent which is inert with respect to hydrogen bromide and in which the equivalent conductance of hydrogen bromide increases as the concentration of hydrogen bromide is increased, treating said solution under anhydrous conditions with hydrogen bromide until the reaction is substantially complete, adding methanol to the reaction mixture in an amount sufficient to dissolve any precipitated solids, adjusting the pH of the reaction mixture to about 7 with alkali, and crystallizing L-glutamine therefrom.

6. The process of claim 5 in which said organic solvent is a lower organic ester.

7. The process of claim 6 in which said lower organic ester is normal propyl acetate.

8. The process of claim 5 in which said organic solvent is chloroform.

9. A process for producing L-glutamine which comprises preparing a solution of a gamma-amide of an N-carboallyloxy-L-glutamic acid in a mixture of acetic acid and ethyl acetate, treating said solution under anhydrous conditions with hydrogen bromide until the reaction is substantially complete, adding methanol to the reaction mixture in an amount sufficient to dissolve any precipitated solids, neutralizing the reaction mixture by adding ammonia thereto, and crystallizing L-glutamine therefrom.

References Cited in the file of this patent

UNITED STATES PATENTS 2,523,744  Warner _____ Sept. 26, 1950

OTHER REFERENCES

Bergmann et al.: Ber. Deut. Chem., vol. 65, pp. 1192–1201 (1932).

Bergmann et al.: Ber. Deut. Chem., vol. 66, pp. 1288–1290 (1933).

Green et al.: J. Biol. Chem., vol. 197, pp. 772, 777–778 (1952).